United States Patent
Faibish et al.

(10) Patent No.: US 10,599,624 B1
(45) Date of Patent: Mar. 24, 2020

(54) STORAGE SYSTEM WITH DIRECTORY-BASED STORAGE TIERING

(71) Applicant: EMC IP Holding Company LLC, Hopkinton, MA (US)

(72) Inventors: Sorin Faibish, Newton, MA (US); Dennis Ting, Groton, MA (US); James M. Pedone, Jr., West Boylston, MA (US); Percy Tzelnic, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 426 days.

(21) Appl. No.: 15/445,008

(22) Filed: Feb. 28, 2017

(51) Int. Cl.
*G06F 16/21* (2019.01)
*G06F 16/28* (2019.01)

(52) U.S. Cl.
CPC .......... *G06F 16/211* (2019.01); *G06F 16/282* (2019.01)

(58) Field of Classification Search
CPC ...... G06F 16/185; G06F 12/08; G06F 16/188; G06F 3/0683; G06F 3/061; G06F 2009/4557; G06F 2201/815; G06F 3/0647; G06F 16/182; G06F 16/1858; G06F 3/0631; H04L 67/109
See application file for complete search history.

(56) References Cited

U.S. PATENT DOCUMENTS

| | | | |
|---|---|---|---|
| 8,055,622 B1 * | 11/2011 | Botes | G06F 16/185 |
| | | | 707/640 |
| 8,825,652 B1 | 9/2014 | Faibish et al. | |
| 8,972,465 B1 | 3/2015 | Faibish et al. | |
| 9,171,009 B1 * | 10/2015 | Faibish | G06F 3/0608 |
| | | | 707/640 |
| 9,223,800 B1 | 12/2015 | Faibish et al. | |
| 10,140,032 B1 * | 11/2018 | Faibish | G06F 3/0611 |
| | | | 707/640 |
| 2005/0120037 A1 * | 6/2005 | Maruyama | G06F 16/10 |
| | | | 707/999.1 |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Yuk Ting Choi
(74) *Attorney, Agent, or Firm* — Ryan, Mason & Lewis, LLP (57) ABSTRACT

An apparatus in one embodiment comprises a storage system having at least first and second storage tiers each comprising a plurality of storage devices. The storage system implements a parallel file system comprising at least first and second sets of storage servers. The first set of storage servers is configured to access directories of the parallel file system that are stored in storage devices of the first storage tier, and the second set of storage servers is configured to access directories of the parallel file system that are stored in storage devices of the second storage tier. The storage system is further configured to move data between the first and second storage tiers by moving data files between different directories of the respective first and second storage tiers. One or more servers of the first set may be generated as respective new server instances on one or more compute nodes.

20 Claims, 4 Drawing Sheets

(56) References Cited

U.S. PATENT DOCUMENTS

| | | | |
|---|---|---|---|
| 2010/0153634 A1 | 6/2010 | Fellinger et al. | |
| 2013/0227194 A1 | 8/2013 | Kannan et al. | |
| 2016/0139841 A1* | 5/2016 | Agetsuma | G06F 3/06 707/640 |
| 2018/0150250 A1* | 5/2018 | Hasegawa | G06F 3/0622 707/640 |

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System."

Adam Moody, "Overview of the Scalable Checkpoint / Restart (SCR) Library," S&T Principal Directorate—Computation Directorate, Oct. 14, 2009, 33 pages.

U.S. Appl. No. 14/973,245 filed in the name of Sorin Faibish et al. on Dec. 17, 2015 and entitled "Multi-Tier Storage System Having Front-End Storage Tier Implemented Utilizing Software-Defined Storage Functionality."

U.S. Appl. No. 15/185,236 filed in the name of Sorin Faibish et al. on Jun. 17, 2016 and entitled "Storage System Comprising Cluster File System Storage Nodes and Software-Defined Storage Pool in Cloud Infrastructure."

C. Yan et al., "Hmfs: Efficient Support of Small Files Processing over HDFS," Algorithms and Architectures for Parallel Processing: Lecture Notes and Computer Science, Aug. 2014, pp. 54-67, vol. 8631.

The Apache Software Foundation,"Hadoop Archives Guide," https://hadoop.apache.org/docs/rl.2.1/hadoop_archives.html, 2008, 4 pages.

U.S. Appl. No. 15/064,314 filed in the name of Sorin Faibish et al. on Mar. 8, 2016 and entitled "Multi-Tier Storage System Configured for Efficient Management of Small Files Associated with Internet of Things."

* cited by examiner

STORAGE SYSTEM WITH DIRECTORY-BASED STORAGE TIERING

FIELD

The field relates generally to information processing systems, and more particularly to storage in information processing systems.

BACKGROUND

Storage systems are often configured to include multiple storage tiers, with different ones of the tiers providing different levels of input-output (TO) performance or other characteristics. In such systems, data may be moved from one tier to another within a given storage system based on access frequency of the data or other factors. However, conventional storage tiering arrangements can be unduly inflexible when implemented in a storage system that comprises a parallel file system.

SUMMARY

Illustrative embodiments provide storage systems with directory-based storage tiering. For example, in some embodiments disclosed herein, multi-tiered storage is dynamically created by exclusively associating parallel file system directories with different sets of storage servers and corresponding storage devices. These and other embodiments advantageously provide parallel file systems with substantially more flexible storage tiering arrangements than would otherwise be possible.

In one embodiment, an apparatus comprises a storage system having at least first and second storage tiers each comprising a plurality of storage devices. The storage system implements a parallel file system comprising at least first and second sets of storage servers. The first set of storage servers is configured to access directories of the parallel file system that are stored in storage devices of the first storage tier, and the second set of storage servers is configured to access directories of the parallel file system that are stored in storage devices of the second storage tier. The storage system is further configured to move data between the first and second storage tiers by moving data files between different directories of the respective first and second storage tiers.

A given one of the directories of the first storage tier may have an extended attribute which indicates its exclusive association with the servers of the first set of servers. Similarly, a given one of the directories of the second storage tier may have an extended attribute which indicates its exclusive association with the servers of the second set of servers.

The extended attribute exclusively associating a given one of the directories with a particular one of the sets of servers is assigned in some embodiments by a job scheduler via an application programming interface of the storage system in conjunction with creation of the given directory.

An application may determine whether to write a given data file to a directory of the first storage tier or to a directory of the second storage tier based at least in part on the respective extended attributes of those directories exclusively associating the directories with respective ones of the first and second sets of servers.

At least a portion of the servers of the first set may be generated in some embodiments as respective new server instances on one or more compute nodes in order to provide a requesting application with access to storage devices of those compute nodes as part of the first storage tier of the storage system.

The data movement between storage tiers in some embodiments is implemented using a SYNCer module of a 2 TIERS™ storage system, although other types of data mover modules can be used in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
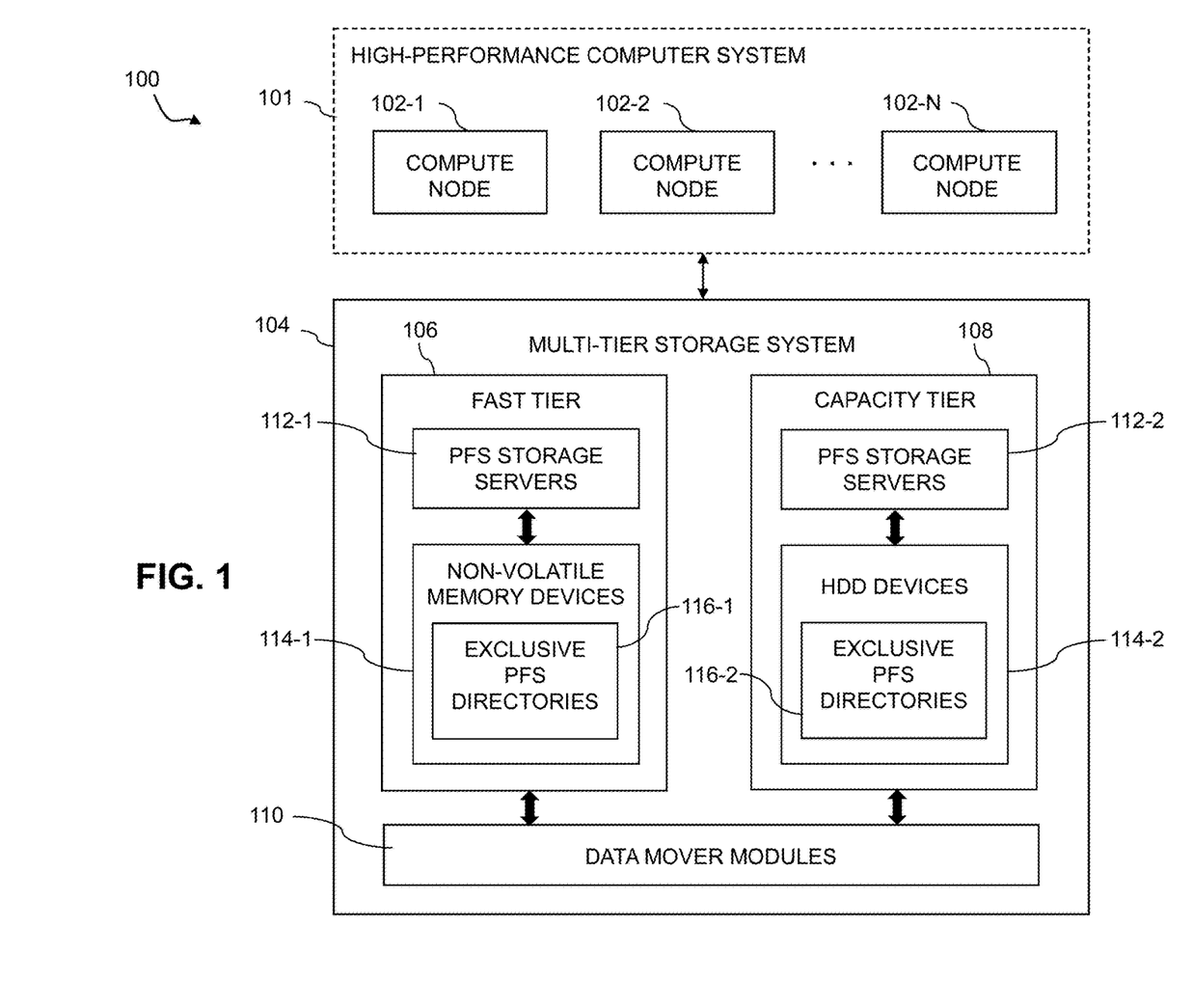
FIG. 1 is a block diagram of an information processing system comprising a storage system with directory-based storage tiering in an illustrative embodiment.

FIG. 1 shows an information processing system 100 configured in accordance with an illustrative embodiment. The information processing system 100 comprises a high-performance computer (HPC) system 101 that includes compute nodes 102-1, 102-2, . . . 102-N. The compute nodes 102 communicate with a multi-tier storage system 104 over one or more networks that are not explicitly shown in the figure.

The compute nodes 102 illustratively comprise respective processing devices of one or more processing platforms. For example, the compute nodes 102 can comprise respective virtual machines each having a processor and a memory. Numerous other configurations are possible. The compute nodes 102 in the present embodiment are illustratively part of a supercomputer or other implementation of HPC system 101.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The multi-tier storage system 104 comprises a fast tier 106, a capacity tier 108 and data mover modules 110. The fast tier 106 is an example of what is more generally referred to herein as a "front-end storage tier" or still more generally a "first storage tier" of the multi-tier storage system 104. The capacity tier 108 is an example of what is more generally referred to herein as a "back-end storage tier" or still more generally a "second storage tier" of the multi-tier storage system 104. Other types and arrangements of two or more storage tiers can be used in other embodiments. Each of the fast tier 106 and the capacity tier 108 is assumed to comprise a plurality of storage devices.

The multi-tier storage system 104 in the present embodiment implements a parallel file system (PFS) comprising at least first and second sets of storage servers 112-1 and 112-2, also referred to as PFS storage servers.

The first set of storage servers 112-1 is configured to access directories of the PFS that are stored in storage devices 114-1 of the fast tier 106. The storage devices 114-1 of the fast tier 106 in this embodiment more particularly comprise respective non-volatile memory devices associated with respective storage servers of the first set of storage servers 112-1. Other relationships between the storage servers 112 and the storage devices 114 are possible. For example, a given one of the storage servers in the set of storage servers 112-1 may be associated with multiple ones of the storage devices 114-1. Accordingly, there need not be a one-to-one relationship between storage servers 112 and storage devices 114.

The storage devices 114-1 of the fast tier 106 in the present embodiment illustratively comprise flash memory devices, 3D XPoint devices, non-volatile random access memory (NVRAM) devices, or other types of non-volatile memory devices including phase-change RAM (PC-RAM) and magnetic RAM (MRAM). Various combinations of multiple different types of non-volatile memory devices may also be used.

The second set of storage servers 112-2 is configured to access directories of the PFS that are stored in storage devices 114-2 of the capacity tier 108. The storage devices 114-2 of the capacity tier 108 in this embodiment more particularly comprise respective hard disk drive (HDD) devices associated with respective storage servers of the second set of storage servers 112-2. Again, other relationships between the storage servers 112 and the storage devices 114 are possible.

The data mover modules 110 of the multi-tier storage system 104 are configured to move data between the fast tier 106 and the capacity tier 108, for example, by moving data files between different directories 116-1 and 116-2 of the respective fast and capacity tiers. The directories 116-1 and 116-2 are more particularly referred to herein as exclusive PFS directories in that the directories 116-1 are exclusively for use by the first set of storage servers 112-1 of the fast tier 106 and the directories 116-2 are exclusively for use by the second set of storage servers 112-2 of the capacity tier 108.

For example, different portions of a given one of the directories 116-1 of the fast tier 106 are stored across respective different ones of the storage devices 114-1 of the fast tier 106 using a striping technique.

Similarly, different portions of a given one of the directories 116-2 of the capacity tier 108 are stored across respective different ones of the storage devices 114-2 of the capacity tier 108 using a striping technique.

The same or different striping techniques may be applied to the directories 116-1 of the fast tier 106 and the directories 116-2 of the capacity tier 108. A wide variety of such striping techniques suitable for use in illustrative embodiments herein are well known to those skilled in the art of storage systems.

In the present embodiment, extended attributes are utilized to exclusively associate particular ones of the directories 116 with particular ones of the sets of storage servers 112. For example, a given one of the directories 116-1 of the fast tier 106 has an extended attribute which indicates its exclusive association with the servers of the first set of storage servers 112-1 of the fast tier 106, and a given one of the directories 116-2 of the capacity tier 108 has an extended attribute which indicates its exclusive association with the servers of the second set of storage servers 112-2 of the capacity tier 108.

Although the multi-tier storage system 104 is shown in FIG. 1 as being entirely separate from the HPC system 101, this is by way of illustrative example only. In other embodiments, at least a subset of the storage devices 114-1 of the fast tier 106 may be implemented in respective ones of the compute nodes 102. Numerous other alternative system configurations are also possible.

Accordingly, a given one of the storage devices 114-1 of the fast tier 106 may in some embodiments comprise a flash memory device, a 3D XPoint device, an NVRAM device or another type of non-volatile memory device of one of the compute nodes 102, or another type of storage device of such a compute node. In an arrangement of this type, at least one of the compute nodes 102 implements at least a portion of the fast tier 106 of the multi-tier storage system 104.

Processing devices utilized to implement system components such as the data mover modules 110 are assumed to be interconnected with one another using high-speed connections. For example, data can be moved between these and other system components using remote direct memory access (RDMA) connections over Gigabit Ethernet ("GbE") or InfiniBand ("IB"). As another example, some embodiments can be configured to utilize an Intel Omni-Path Host Fabric Interface (OP HFI). Numerous other types of connections and associated data transfer protocols can be used in other embodiments, including Fibre Channel.

In some embodiments, the fast tier 106 is implemented at least in part using software-defined storage such as ScaleIO™ or ViPR® both of which are commercially available from Dell EMC of Hopkinton, Mass. Additional details regarding ScaleIO™ functionality that can be incorporated into a multi-tier storage system in illustrative embodiments can be found in, for example, EMC ScaleIO™ User Guide, V1.32, Document No. 302-001-033, Rev. 11, May 2015, which is incorporated by reference herein.

The capacity tier 108 in some embodiments is implemented at least in part utilizing a scale-out network-attached storage (NAS) cluster and/or an object store.

For example, the capacity tier 108 can include a scale-out NAS cluster implemented using Isilon® platform nodes and associated accelerators in the S-Series, X-Series and NL-Series product lines, all commercially available from Dell EMC.

Additionally or alternative, the capacity tier 108 can include an object store implemented using cloud storage such as Elastic Cloud Storage (ECS) from Dell EMC. Other examples of object stores that can be used in a given embodiment include object stores implemented using object-based storage products such as Atmos, also from Dell EMC.

The capacity tier 108 in some embodiments includes an object store that is part of the same cloud infrastructure that provides the compute nodes 102. Examples of cloud-based object stores that can be utilized for object store in some embodiments include Amazon Simple Storage Service (S3), GCP Cloud Storage, and Microsoft Azure Blob Storage.

A given such object store of the capacity tier 108 is configured to store a plurality of objects. Each of the objects stored in the object store is assumed to have a unique object identifier (OID). It is also possible that the capacity tier 108 could comprise multiple object stores, or other types of object storage.

A specified set of objects stored in the object store may be made accessible to an application running on a given one of the compute nodes 102 via a corresponding dynamically loadable namespace (DLN) identifier. The DLN identifier is associated with a DLN object stored in the object store, with the DLN object comprising identifiers of respective ones of the objects in the specified set.

In some embodiments, a translator at least partially incorporated in or otherwise associated with the multi-tier storage system 104 implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of an object store of the capacity tier 108 are made accessible to the application via the name node. The translator via the translation services and the at least one index table permits applications running on respective compute nodes having no knowledge of the object storage structure of the object store to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed and entitled "Translation-Based Name Node Configuration for Object Access in a Multi-Tier Storage System," which is commonly assigned herewith and incorporated by reference herein.

Again, the fast tier 106, capacity tier 108 and data mover modules 110 are all assumed to be part of the multi-tier storage system 104 of information processing system 100, although other arrangements are possible in other embodiments. For example, components such as data mover modules 110 in other embodiments can be implemented at least in part externally to the multi-tier storage system 104.

Also, it should be noted that data mover modules 110 that are shown as separate from the fast tier 106 and capacity tier 108 in the FIG. 1 embodiment can be implemented at least in part within at least one of the tiers. For example, the data mover modules 110 can be implemented in a distributed manner using storage nodes that are used to implement respective portions of at least one of the fast and capacity tiers.

It is assumed that the fast tier 106 has a relatively high input-output processing speed and a relatively low capacity and the capacity tier 108 has a relatively low input-output processing speed and a relatively high capacity, although other types of multi-tier storage systems can be used in other embodiments.

The data mover modules 110 are illustratively coupled to the fast tier 106 and the capacity tier 108 and configured to control transfer of data between these storage tiers. The term "data movement" as used in this and other contexts herein is intended to be broadly construed, so as to encompass data migration as well as other types of movement of data between storage tiers of a multi-tier storage system. A given data mover module can be implemented at least in part on storage arrays or other storage platforms that implement at least portions of one or more of the storage tiers of the multi-tier storage system 104.

As indicated previously, each of the fast tier 106 and the capacity tier 108 of the multi-tier storage system 104 comprises a plurality of storage devices with different types of storage devices being used in different ones of the storage tiers. For example, the fast tier 106 may comprise flash drives while the capacity tier 108 comprises hard disk drives or solid state drives. The particular storage devices used in a given storage tier may be varied in other embodiments, and multiple distinct storage device types may be used within a single storage tier. The term "storage device" as used herein is intended to be broadly construed, so as to encompass, for example, flash drives, hard disk drives, solid state drives, hybrid drives or other types of storage devices.

The storage devices utilized in the fast tier 106 are generally significantly faster in terms of read and write access times than the storage devices utilized in the capacity tier 108. Accordingly, the fast tier 106 in some embodiments is a relatively small storage tier optimized for IO processing speed, while the capacity tier 108 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Such alternative arrangements can include, for example, one or more intermediate storage tiers arranged between the front-end and back-end storage tiers of a multi-tier storage system 104.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 106 and the capacity tier 108 of the multi-tier storage system 104 are implemented at least in part utilizing a 2 TIERS™ storage system from Dell EMC. By way of example, a given 2 TIERS™ storage system may comprise DSSD™ server-based flash storage devices utilized to implement at least portions of fast tier 106, and a scale-out NAS cluster and/or an object store utilized to implement at least a portion of capacity tier 108. In such an arrangement, an IO dispatcher software layer of the 2 TIERS™ storage system may be configured to provide at least a portion of the data mover modules 110. For example, such an IO dispatcher software layer can be used to pre-fetch data from the capacity tier 108 into the fast tier 106, as well as to support other types of data movement. In some embodiments, this functionality is performed utilizing SYNCer modules of the 2 TIERS™ storage system.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 110 may be configured to control movement of data between the fast tier 106 and the capacity tier 108 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 110 can communicate with the compute nodes 102, fast tier 106 and capacity tier 108 via one or more networks or other types of communication media. In distributed implementations, different modules or other portions of a given distributed system component such as data mover modules 110 can be implemented in respective ones of a plurality of storage nodes.

It is to be appreciated that these and other features of illustrative embodiments are presented by way of example only, and should not be construed as limiting in any way.

Accordingly, different numbers, types and arrangements of system components such as compute nodes 102, fast tier 106, capacity tier 108 and data mover modules 110 can be used in other embodiments.

The fast tier 106, capacity tier 108, data mover modules 110 and possibly other elements of the system 100 can be implemented using one or more storage platforms. For example, a given storage platform can comprise any of a variety of different types of storage including storage area networks (SANs), direct-attached storage (DAS) and distributed DAS, as well as combinations of these and other storage types, including software-defined storage. A given storage platform may comprise storage arrays such as VNX® and Symmetrix VMAX® storage arrays or scale-out all-flash storage arrays such as XtremIO™, all commercially available from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The data mover modules 110, as well as other system components, may be implemented at least in part using processing devices of such processing platforms.

For example, in a distributed implementation of the data mover modules 110, such modules may be implemented in respective LXCs running on respective ones of the compute nodes 102 or on storage nodes of the fast tier 106 or capacity tier 108.

Communications between the various elements of system 100 may take place over one or more networks not explicitly shown. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as Gigabit Ethernet, InfiniBand, Omni-Path Host Fabric Interface or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other types of systems comprising a multi-tier storage system providing directory-based storage tiering functionality implemented using multiple sets of storage servers associated with respective exclusive directories.

In step 200, a parallel file system is implemented in a multi-tier storage system. The parallel file system comprises at least first and second sets of storage servers. By way of example, in some embodiments the parallel file system is implemented using OrangeFS ("OFS") although other embodiments can utilize other types of parallel file systems including GPFS, Lustre and PVFS. Parallel file systems in some implementations of this type are also sometimes referred to as "distributed file systems" or "cluster file systems."

In step 202, the first set of storage servers is configured to access directories of the parallel file system that are stored in storage devices of a first storage tier of the multi-tier storage system.

In step 204, the second set of storage servers is configured to access directories of the parallel file system that are stored in storage devices of a second storage tier of the multi-tier storage system.

Each of the directories of the first storage tier illustratively has an extended attribute which indicates its exclusive association with the servers of the first set of servers. Similarly, each of the directories of the second storage tier illustratively has an extended attribute which indicates its exclusive association with the servers of the second set of servers.

The extended attributes of the directories exclusively associated with respective storage tiers can be read by applications and utilized by those applications to determine where to write particular data files based on the current processing demands of the applications. For example, different directories exclusively associated with storage devices of different storage tiers may be used for files of different types, such as large or small files, as well as for different processing conditions such as random IOs or sequential IOs. The extended attributes can additionally or alternatively be used to label the corresponding directories as temporary or permanent, as well as to indicate to a data mover module the particular conditions under which the directories can be deleted or moved.

With reference by way of example to the previously-described FIG. 1 embodiment, the first set of storage servers comprises the PFS storage servers 112-1 which are implemented on the fast tier 106 and provide access to exclusive PFS directories 116-1 of the storage devices 114-1. Similarly, the second set of storage servers comprises the PFS storage servers 112-2 which are implemented on the capacity tier 108 and provide access to exclusive PFS directories 116-2 of the storage devices 114-2. Such an arrangement is an illustrative example of what is more generally referred to herein as directory-based storage tiering.

In step 206, data is moved between the first and second storage tiers by moving data files between different directories of the respective first and second storage tiers. Such data movement is controlled in the FIG. 1 embodiment by the data mover modules 110, which can be implemented in a distributed manner utilizing components residing on compute nodes and/or storage nodes of the system 100.

Figure 2:
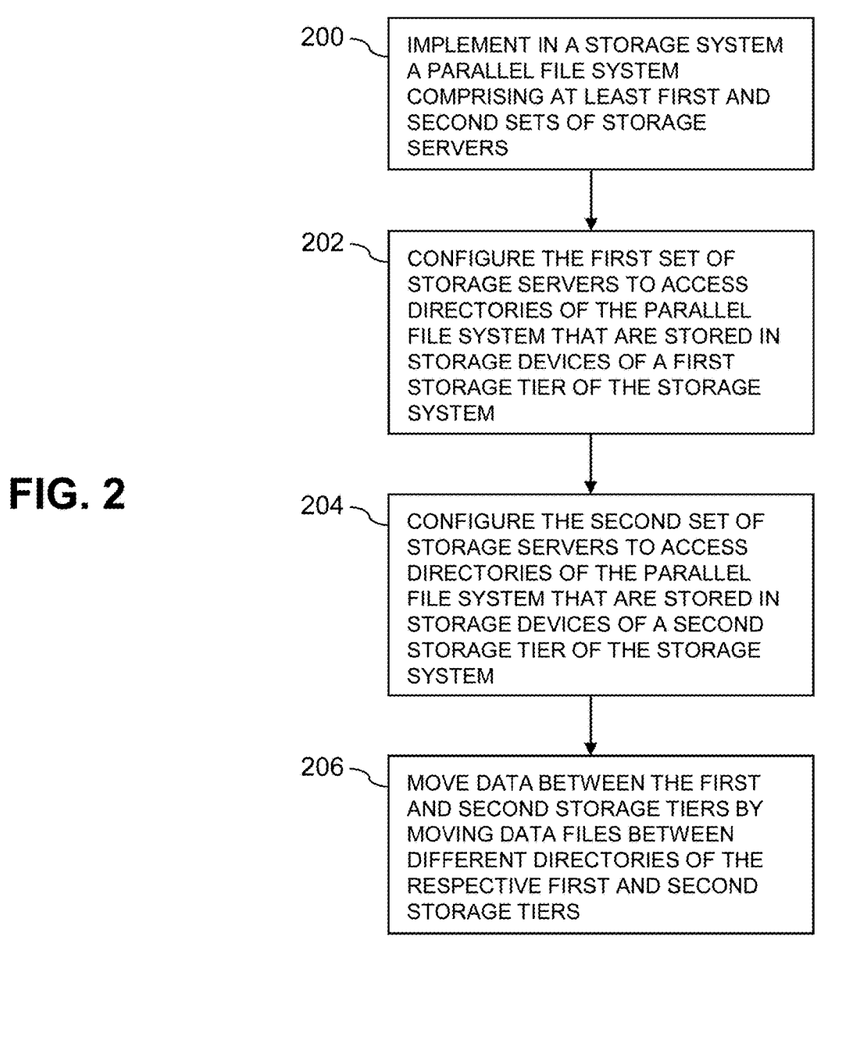
FIG. 2 is a flow diagram of a process for directory-based storage tiering in an illustrative embodiment.

The data movement of step 206 of the FIG. 2 process in some embodiments can include movement of data files between a temporary directory of the first storage tier and a permanent directory of the second storage tier.

An extended attribute exclusively associating a given one of the directories with a particular one of the sets of servers may be assigned by a job scheduler via an application programming interface (API) of the multi-tier storage system in conjunction with creation of the given directory.

An application running on a compute node determines whether to write a given data file to a directory of the first storage tier or to a directory of the second storage tier based at least in part on respective extended attributes of those directories exclusively associating the directories with respective ones of the first and second sets of servers.

At least a portion of the servers of the first set are illustratively generated as respective new server instances on one or more compute nodes in order to provide a requesting application with access to storage devices of those compute nodes as part of the first storage tier of the storage system.

As indicated above, some embodiments utilize OFS in combination with SYNCer modules of a 2 TIERS™ storage system. For example, such an arrangement allows an application to add OFS storage server instances on demand to a directory exclusively associated with local flash devices or NVMe ("Non-Volatile Memory Express") devices of a fast tier. The application can increase the number of OFS storage server instances of the directory as needed to achieve a desired IO latency. After the processing job is complete, the data can be moved to a directory exclusively associated with higher latency storage devices on a capacity tier. A SYNCer module may be utilized to move the data from the directory of the fast tier to the directory of the slower capacity tier. The directory of the fast tier can be a temporary directory that is deleted by the SYNCer module after the movement of the data to a permanent directory of the capacity tier is completed. Such an arrangement provides an efficient and flexible mechanism for temporary IO acceleration responsive to the particular demands of an application.

It is to be appreciated that the FIG. 2 process can be adapted for use with a wide variety of other types of multi-tier storage systems, including by way of example a multi-tier storage system in which the fast tier comprises burst buffer appliances and/or a software-defined storage pool, and a multi-tier storage system in which the capacity tier comprises a scale-out NAS cluster and/or an object store.

The particular processing operations and other system functionality described in conjunction with the flow diagram of FIG. 2 are presented by way of illustrative example only, and should not be construed as limiting the scope of the embodiments in any way. Alternative embodiments can use other types of processing operations involving a multi-tier storage system implemented using directories exclusively associated with respective sets of storage servers. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different storage system instances within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising compute nodes and a multi-tier storage system will now be described with reference to FIGS. 3 and 4. In each of these embodiments, the multi-tier storage system is implemented using a fast tier and a capacity tier, although it is to be appreciated that additional or alternative storage tiering arrangements can be used.

Figure 3:
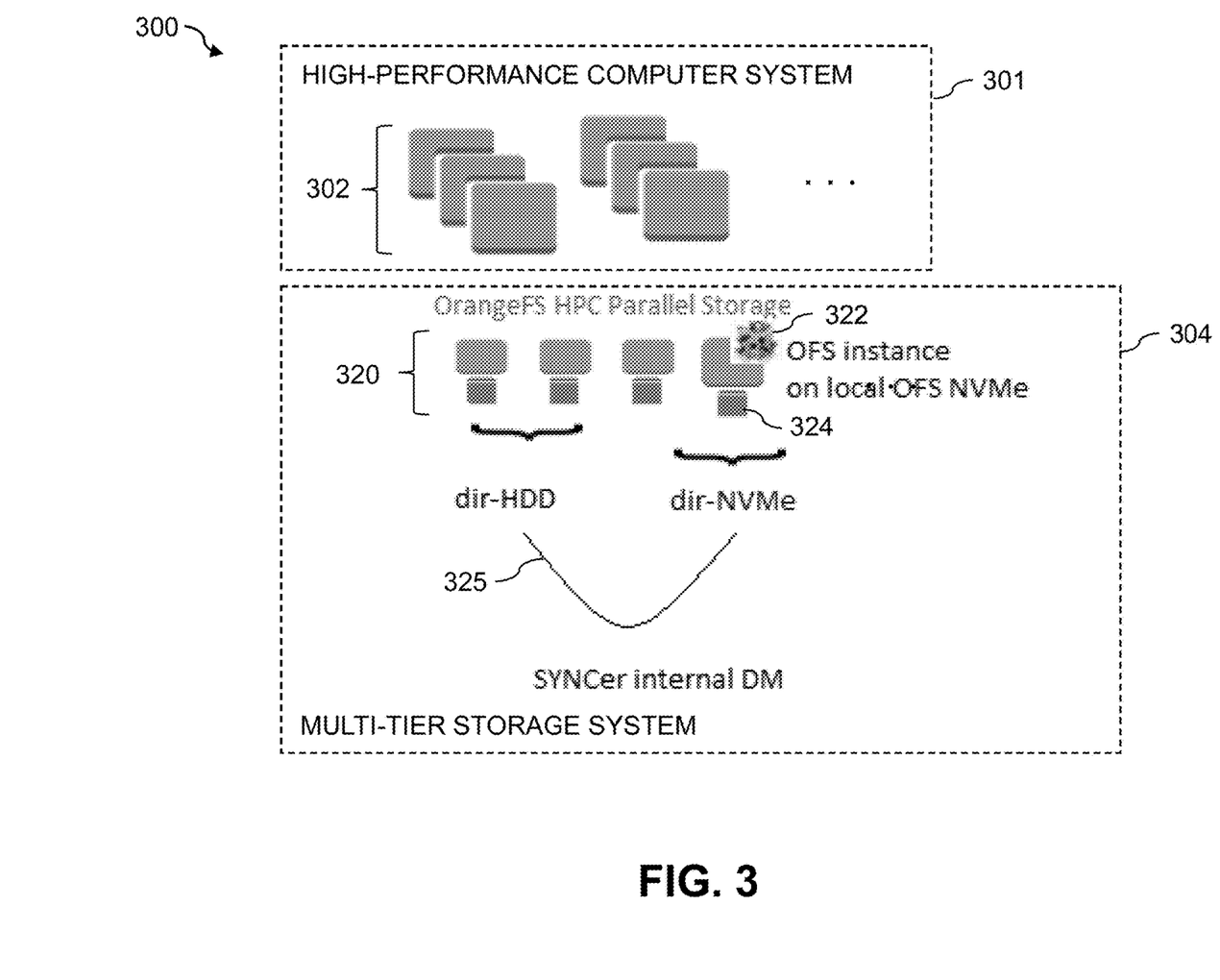
FIGS. 3 and 4 are block diagrams of additional illustrative embodiments of information processing systems comprising storage systems with directory-based storage tiering.

Referring now to FIG. 3, an information processing system 300 comprises an HPC system 301 having a plurality of compute nodes 302. The system 300 further comprises a multi-tier storage system 304 that includes storage devices and associated storage servers collectively denoted by reference numeral 320. A given one of the storage servers and its one or more corresponding storage devices is an example of what is also referred to herein as a "storage node." The multi-tier storage system 304 implements a parallel file system utilizing OrangeFS ("OFS") to provide parallel storage functionality for the HPC system 301 using the storage devices and associated storage servers 320.

The multi-tier storage system 304 in this embodiment is assumed to be implemented at least in part utilizing the above-noted 2 TIERS™ storage system from Dell EMC. More particularly, the data mover (DM) functionality of the multi-tier storage system 304 is implemented at least in part utilizing SYNCer modules of the 2 TIERS™ storage system. Accordingly, data mover modules of the multi-tier storage system are illustratively implemented as respective 2 TIERS™ SYNCer modules. Such SYNCer modules are illustratively part of an IO dispatcher software layer of the 2 TIERS™ storage system.

The multi-tier storage system 304 in the FIG. 3 embodiment includes two distinct sets of storage servers including a first set of storage servers exclusively associated with an OFS directory dir-NVMe of a fast tier comprising non-volatile memory devices and a second set of storage servers exclusively associated with an OFS directory dir-HDD of a capacity tier comprising hard disk drive devices.

The first set of storage servers of the fast tier illustratively includes an OFS storage server 322 associated with a local OFS NVMe storage device 324.

Movement of data between the storage tiers of the multi-tier storage system 304 is controlled by SYNCer internal DM modules configured to perform data movement operations such as that illustrated by reference numeral 325. In this example, the SYNCer internal DM module more particularly controls movement of data files from a storage node of the fast tier to a storage node of the capacity tier and vice-versa.

Numerous different conditions can lead to movement of data between the storage tiers in the FIG. 3 embodiment and other embodiments disclosed herein.

As one example, consider an analytics application that detects the use of an input data set that includes large numbers of small files such as those generated by Internet of Things (IoT) sensors. It is further assumed that the analytics application can process a wide variety of different types of data and that it does not know the particular characteristics of the input data set in advance. Upon detection of the input data set with large numbers of small files, the application can write the files to a temporary directory that is exclusively associated with storage servers and storage devices of the fast tier so as to optimize 10 performance. The application identifies the temporary directory using its OFS extended attribute and locks the temporary directory while the input data set is being processed so that the temporary directory cannot be deleted or moved. After the processing of the input data set is complete, the application removes the lock and this will indicate to the SYNCer module that the data can be moved from the temporary directory to a permanent directory exclusively associated with the slower capacity tier. The SYNCer module can also delete the temporary directory from the fast tier.

As another example, if an application knows the particular characteristics of an input data set in advance, a job scheduler can be used to create a temporary directory on the appropriate storage tier in advance.

Figure 4:
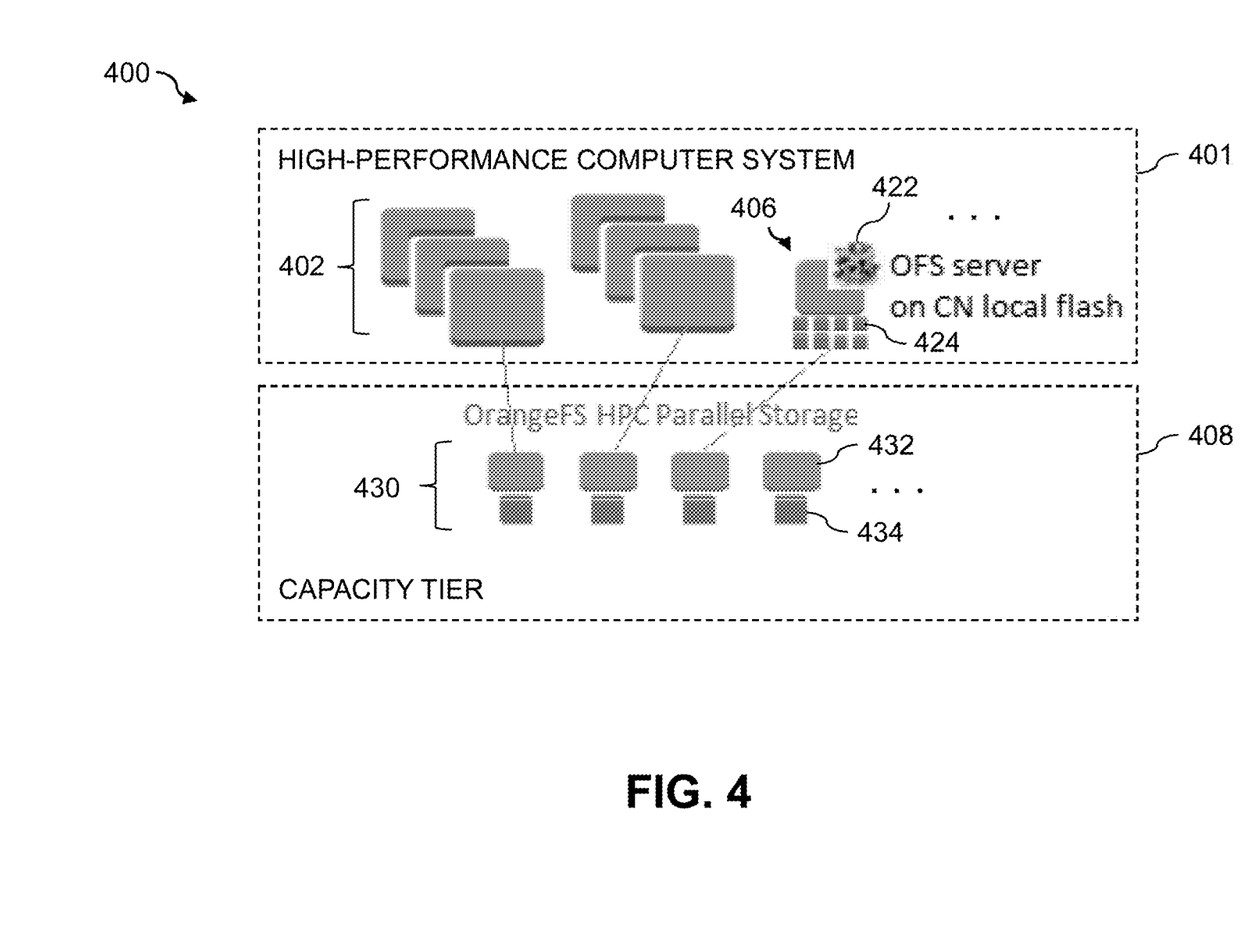

Another illustrative embodiment is shown in FIG. 4. In this embodiment, an information processing system 400 comprises an HPC system 401 having a plurality of compute nodes 402. The system 400 further comprises a multi-tier storage system that includes a fast tier 406 and a capacity tier 408.

The fast tier 406 in this embodiment is implemented using storage devices and associated storage servers of at least a subset of the compute nodes 402. For example, a given one of the compute nodes 402 as illustrated includes an OFS storage server 422 associated with local flash storage devices 424 of the compute node ("CN"). Other ones of the compute nodes 402 may similarly implement respective OFS storage servers and associated local flash storage devices so as to collectively provide the fast tier 406. The capacity tier 408 in this embodiment is implemented using storage nodes 430 each comprising an OFS storage server 432 and a corresponding storage device 434.

The multi-tier storage system in the FIG. 4 embodiment therefore includes two distinct sets of storage servers, including a first set of storage servers exclusively associated with OFS directories of the fast tier 406 stored on local flash storage devices of the compute nodes 402 and a second set of storage servers exclusively associated with OFS directories of the storage nodes 430 of the capacity tier 408.

Although not explicitly shown in the figure, data mover modules are implemented in the multi-tier storage system of FIG. 4 in order to control movement of data files between the local flash storage devices 424 of the fast tier 406 and the storage devices 434 of the capacity tier 408. Such data mover modules are assumed to be implemented as respective 2 TIERS™ SYNCer modules. As noted previously, the SYNCer modules are illustratively part of an IO dispatcher software layer of the 2 TIERS™ storage system.

As one example of a possible implementation of the FIG. 4 embodiment, assume that an application running on a supercomputer using OFS wants to perform checkpointing without scheduling data movement from the compute nodes but instead using the local NVMe devices on the compute nodes. The application utilizes a job scheduler to create a new local directory exclusively associated with storage servers and storage devices of the fast tier implemented on the compute nodes. The local directory is locked to prevent its deletion or movement. The job scheduler is further utilized to create instances of OFS storage servers on respective ones of the compute nodes to be checkpointed and to exclusively associate those OFS storage server instances with the local directory.

When the checkpointing is completed, the local directory is unlocked and this will indicate to the SYNCer module that the checkpoint data can be moved from the local directory to a permanent directory exclusively associated with the slower capacity tier. The SYNCer module can also delete the local directory from the fast tier.

Such an arrangement can advantageously ensure that the checkpoint data is moved in the background without interfering with the normal operation of the application running on the compute nodes. After the checkpoint data is moved, the application can lock the permanent directory so as to "pin" the checkpoint data in that directory in order to facilitate later access for recovery purposes.

It should be understood that the particular system configurations illustrated in FIGS. 3 and 4 are presented by way of illustrative example only, and should not be construed as limiting in any way. Numerous alternative configurations of compute nodes, storage tiers, data mover modules and other system elements can be used in other embodiments. For example, although the embodiments of FIGS. 3 and 4 illustratively utilize OFS in implementing the sets of storage servers and the exclusively associated directories of the fast and capacity tiers, the disclosed techniques can be extended in a straightforward manner to any of a wide variety of alternative parallel file systems.

In these and other embodiments, a multi-tier storage system can be offered to cloud infrastructure customers as a platform-as-a-service offering.

Illustrative embodiments of directory-based storage tiering disclosed herein can provide a number of significant advantages relative to conventional arrangements.

For example, in some embodiments disclosed herein, multi-tiered storage is dynamically created by exclusively associating parallel file system directories with different sets of storage servers and corresponding storage devices. These and other embodiments advantageously provide parallel file systems with substantially more flexible storage tiering arrangements than would otherwise be possible.

Some embodiments are configured so as to allow parallel file system directories to be striped across the same set of storage servers and associated storage devices over which corresponding data files are striped. Moreover, the particular set of storage servers and associated storage devices over which the directories and data files are striped can be dynamically varied over time. These and other embodiments considerably facilitate the dynamic movement of data between different storage tiers having different types of storage resources responsive to the particular needs of a given application.

Accordingly, illustrative embodiments provide enhanced efficiency in implementation of a multi-tier storage system comprising fast and capacity tiers. These embodiments can provide a substantial reduction in the costs associated with storage deployment in a wide variety of different information processing system contexts.

Illustrative embodiments not only significantly reduce storage costs relative to conventional arrangements, but can also provide significant improvements in terms of data access performance and scalability relative to conventional arrangements. For example, reduced data access latency can be provided and larger numbers of compute nodes supported than in conventional multi-tier storage system arrangements. Also, these embodiments can facilitate recovery from failures and therefore improve storage system availability.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered examples of illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102 and multi-tier storage system 104 comprising fast tier 106, capacity tier 108 and data mover modules 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute nodes, storage systems, storage tiers, storage devices, file systems, directories and data mover modules. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
   a storage system comprising at least first and second storage tiers each comprising a plurality of storage devices;
   the storage system implementing a parallel file system comprising at least first and second sets of storage servers;
   the first set of storage servers being configured to access directories of the parallel file system that are stored in storage devices of the first storage tier; and
   the second set of storage servers being configured to access directories of the parallel file system that are stored in storage devices of the second storage tier;
   wherein the storage system is further configured to move data between the first and second storage tiers by moving data files between different directories of the respective first and second storage tiers;
   a given one of the directories of the first storage tier having an extended attribute which indicates its exclusive association with the servers of the first set of servers; and
   a given one of the directories of the second storage tier having an extended attribute which indicates its exclusive association with the servers of the second set of servers;
   the extended attributes thereby exclusively associating particular ones of the directories with particular ones of the sets of storage servers;
   wherein an application determines whether to write a given data file to a directory of the first storage tier or to a directory of the second storage tier based at least in part on respective extended attributes of those directories exclusively associating the directories with respective ones of the first and second sets of servers; and
   wherein the storage system is further configured to move data files between a temporary directory of the first storage tier and a permanent directory of the second storage tier.

2. The apparatus of claim 1 wherein the storage devices of the first storage tier comprise respective non-volatile memory devices associated with respective storage servers of the first set of storage servers.

3. The apparatus of claim 1 wherein the storage devices of the second storage tier comprise respective hard disk drive devices associated with respective storage servers of the second set of storage servers.

4. The apparatus of claim 1 wherein at least a subset of the storage devices of the first storage tier are implemented in respective compute nodes of an information processing system that incorporates the storage system.

5. The apparatus of claim 1 wherein a given one of the storage devices of the first storage tier comprises a non-volatile memory device of a compute node.

6. The apparatus of claim 1 wherein different portions of a given one of the directories of the first storage tier are stored across respective different ones of the storage devices of the first storage tier using a striping technique.

7. The apparatus of claim 1 wherein different portions of a given one of the directories of the second storage tier are stored across respective different ones of the storage devices of the second storage tier using a striping technique.

8. The apparatus of claim 1 wherein an extended attribute exclusively associating a given one of the directories with a particular one of the sets of servers is assigned by a job scheduler via an application programming interface of the storage system in conjunction with creation of the given directory.

9. The apparatus of claim 1 wherein at least a portion of the servers of the first set are generated as respective new server instances on one or more compute nodes in order to provide a requesting application with access to storage devices of those compute nodes as part of the first storage tier of the storage system.

10. The apparatus of claim 1 further comprising a plurality of compute nodes wherein at least one of the compute nodes implements at least a portion of the first storage tier of the storage system.

11. A method comprising:
    implementing in a storage system a parallel file system comprising at least first and second sets of storage servers;
    configuring the first set of storage servers to access directories of the parallel file system that are stored in storage devices of a first storage tier of the storage system;
    configuring the second set of storage servers to access directories of the parallel file system that are stored in storage devices of a second storage tier of the storage system; and
    moving data between the first and second storage tiers by moving data files between different directories of the respective first and second storage tiers;
    a given one of the directories of the first storage tier having an extended attribute which indicates its exclusive association with the servers of the first set of servers; and
    a given one of the directories of the second storage tier having an extended attribute which indicates its exclusive association with the servers of the second set of servers;
    the extended attributes thereby exclusively associating particular ones of the directories with particular ones of the sets of storage servers;
    wherein an application determines whether to write a given data file to a directory of the first storage tier or to a directory of the second storage tier based at least in part on respective extended attributes of those directories exclusively associating the directories with respective ones of the first and second sets of servers;

wherein the storage system is further configured to move data files between a temporary directory of the first storage tier and a permanent directory of the second storage tier; and wherein the method is performed by a processing platform comprising a plurality of processing devices.

12. The method of claim 11 wherein at least a portion of the servers of the first set are generated as respective new server instances on one or more compute nodes in order to provide a requesting application with access to storage devices of those compute nodes as part of the first storage tier of the storage system.

13. A non-transitory processor-readable storage medium having stored therein program code of one or more software programs, wherein the program code when executed by a processing platform causes said processing platform:

to implement in a storage system a parallel file system comprising at least first and second sets of storage servers;

to configure the first set of storage servers to access directories of the parallel file system that are stored in storage devices of a first storage tier of the storage system;

to configure the second set of storage servers to access directories of the parallel file system that are stored in storage devices of a second storage tier of the storage system; and to move data between the first and second storage tiers by moving data files between different directories of the respective first and second storage tiers;

a given one of the directories of the first storage tier having an extended attribute which indicates its exclusive association with the servers of the first set of servers; and a given one of the directories of the second storage tier having an extended attribute which indicates its exclusive association with the servers of the second set of servers;

the extended attributes thereby exclusively associating particular ones of the directories with particular ones of the sets of storage servers;

wherein an application determines whether to write a given data file to a directory of the first storage tier or to a directory of the second storage tier based at least in part on respective extended attributes of those directories exclusively associating the directories with respective ones of the first and second sets of servers; and wherein the storage system is further configured to move data files between a temporary directory of the first storage tier and a permanent directory of the second storage tier.

14. The processor-readable storage medium of claim 13 wherein at least a portion of the servers of the first set are generated as respective new server instances on one or more compute nodes in order to provide a requesting application with access to storage devices of those compute nodes as part of the first storage tier of the storage system.

15. The processor-readable storage medium of claim 13 wherein an extended attribute exclusively associating a given one of the directories with a particular one of the sets of servers is assigned by a job scheduler via an application programming interface of the storage system in conjunction with creation of the given directory.

16. The method of claim 11 wherein an extended attribute exclusively associating a given one of the directories with a particular one of the sets of servers is assigned by a job scheduler via an application programming interface of the storage system in conjunction with creation of the given directory.

17. The method of claim 11 wherein first and second ones of the directories exclusively associated via their respective extended attributes with different ones of the sets of storage servers are used for respective first and second different types of files.

18. The method of claim 11 wherein first and second ones of the directories exclusively associated via their respective extended attributes with different ones of the sets of storage servers are used for respective first and second different types of input-output operations.

19. The processor-readable storage medium of claim 13 wherein first and second ones of the directories exclusively associated via their respective extended attributes with different ones of the sets of storage servers are used for respective first and second different types of files.

20. The processor-readable storage medium of claim 13 wherein first and second ones of the directories exclusively associated via their respective extended attributes with different ones of the sets of storage servers are used for respective first and second different types of input-output operations.

* * * * *